United States Patent
Markaryan et al.

(10) Patent No.: US 8,086,741 B2
(45) Date of Patent: Dec. 27, 2011

(54) METHOD AND SYSTEM FOR DELAYED ALLOCATION OF RESOURCES

(75) Inventors: Mark Markaryan, Seattle, WA (US); Dmitry M. Kakurin, Redmond, WA (US); Sean C. Olson, Kirkland, WA (US); Srikanth Shoroff, Sammamish, WA (US); Radu Ionescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2231 days.

(21) Appl. No.: 10/641,525

(22) Filed: Aug. 15, 2003

(65) Prior Publication Data

US 2004/0172474 A1 Sep. 2, 2004

Related U.S. Application Data

(60) Provisional application No. 60/451,151, filed on Feb. 28, 2003.

(51) Int. Cl.
*G06F 15/16* (2006.01)
(52) U.S. Cl. ..................... 709/228
(58) Field of Classification Search ............ 709/228
See application file for complete search history.

(56) References Cited

U.S. PATENT DOCUMENTS

| | | | |
|---|---|---|---|
| 4,764,865 | A | 8/1988 | Temple, III |
| 6,012,129 | A | 1/2000 | Hartner et al. |
| 6,427,154 | B1 | 7/2002 | Kolodner et al. |
| 7,571,238 | B1 * | 8/2009 | Reeves et al. .......... 709/229 |
| 2001/0056495 | A1 * | 12/2001 | Iida ................... 709/229 |
| 2002/0174219 | A1 * | 11/2002 | Mei et al. ............... 709/224 |
| 2003/0018784 | A1 * | 1/2003 | Lette et al. .............. 709/226 |
| 2005/0149759 | A1 * | 7/2005 | Vishwanath et al. ..... 713/201 |

FOREIGN PATENT DOCUMENTS

| | | |
|---|---|---|
| JP | 2003503943 T | 1/2003 |
| RU | 2134931 C1 | 8/1999 |
| RU | 2141131 C1 | 11/1999 |

(Continued)

OTHER PUBLICATIONS

Parameswar et al.: "*The SIP Negotiate Method*", IETF Internet Draft, Mar. 2002, pp. 1-18, retrieved from http://www.ietf.org/internet-drafts/draft-spbs-sip-negotiate-01.txt, Feb. 25, 2003.
Pall: "*Microsoft Point-To-Point Compression (MPPC) Protocol*", IETF Network Working Group, Mar. 1997, pp. 1-8, retrieved from http://www.ietq.org/rfc/rfc2118.txt, Feb. 25, 2003.

(Continued)

*Primary Examiner* — Douglas Blair
*Assistant Examiner* — Angela Nguyen
(74) *Attorney, Agent, or Firm* — Perkins Coie LLP

(57) ABSTRACT

The present invention allows a server to delay allocating resources to a client's request. When the client requests a feature that requires server resources, the server accepts and acknowledges the client's request, but the client is prohibited from using the requested feature until further notice from the server. For example, during an authorization process, the server allocates only the minimum resources required to maintain the session and to authorize the client. Thereafter, the server allocates the resources necessary to support the client's request only when the resources become available. Until then, the server maintains the communications session without supporting the request. Thus, the server shepherds its resources rather than committing them at the whim of a client. Also, a client need not repeat its request if the server cannot immediately satisfy it; instead, the server accepts the request and then later begins to support it when adequate resources become available.

36 Claims, 10 Drawing Sheets

FOREIGN PATENT DOCUMENTS

| WO | WO-9708624 A1 | 3/1997 |
| WO | WO-0103345 A1 | 1/2001 |

OTHER PUBLICATIONS

Rosenberg: "*A Framework for Conferencing with the Session Initiation Protocol*", IETF Internet Draft, Feb. 12, 2003, pp. 1-35, retrieved from http://www.jdrosen.net/papers/draft-rosenberg-sipping-conferencing-framework-01.txt.

"*Microsoft Real Time Communications Server 1.0*", Chapter 4 selections, 14 pgs.

Pall, G., "Microsoft Point-To-Point Compression (MPPC) Protocol," Mar. 1997, Network Working Group, RFC 2118, 8 pages.

Parameswar, Sriram and Brian Stucker, "The SIP Negotiate Method," Aug. 2001, Internet Draft, Internet Engineering Task Force, 18 pages.

Rosenberg, J., "A Framework for Conferencing with the Session Initiation Protocol," Feb. 12, 2003, Internet Draft, Internet Engineering Task Force, 35 pages.

* cited by examiner

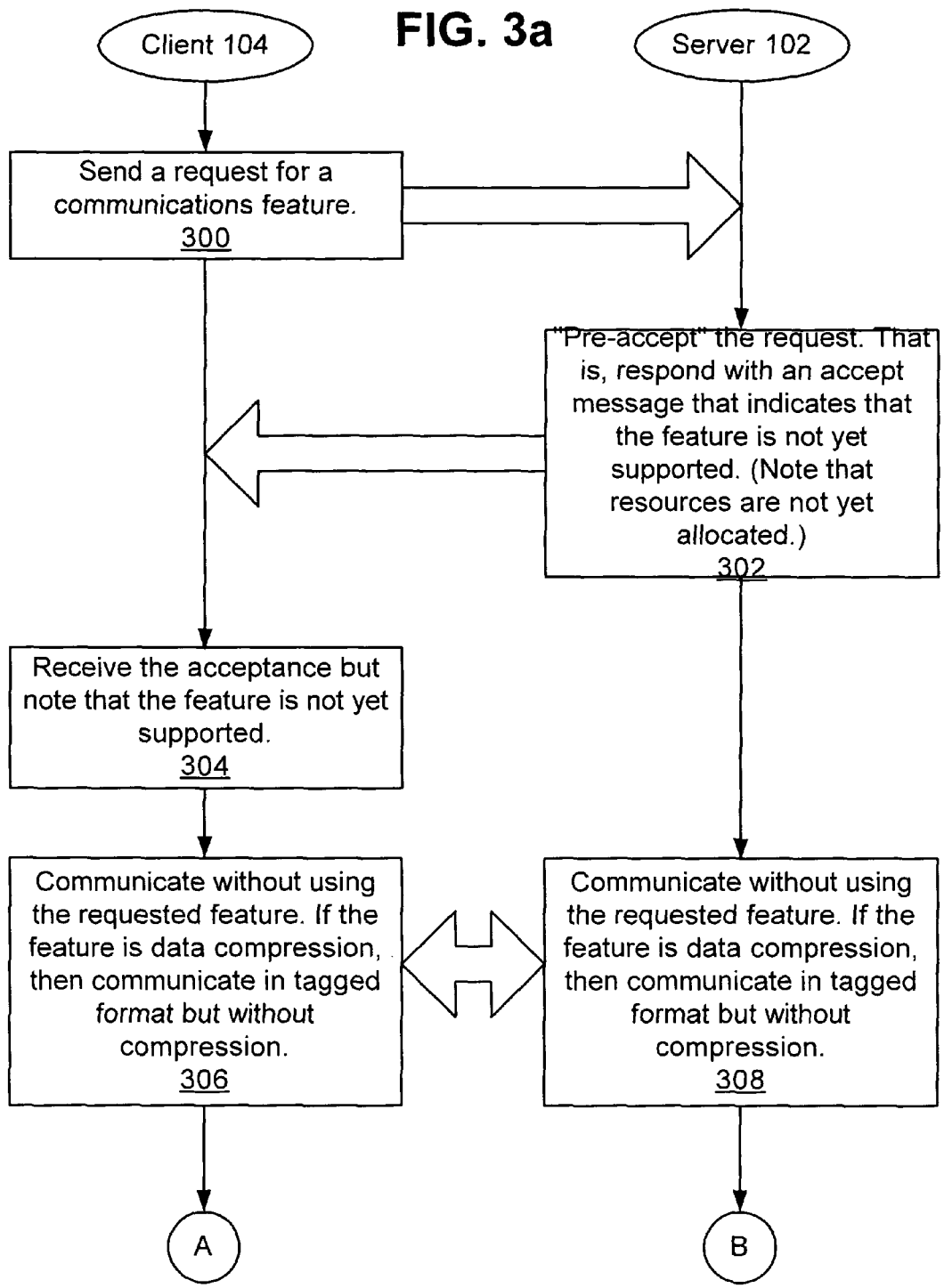

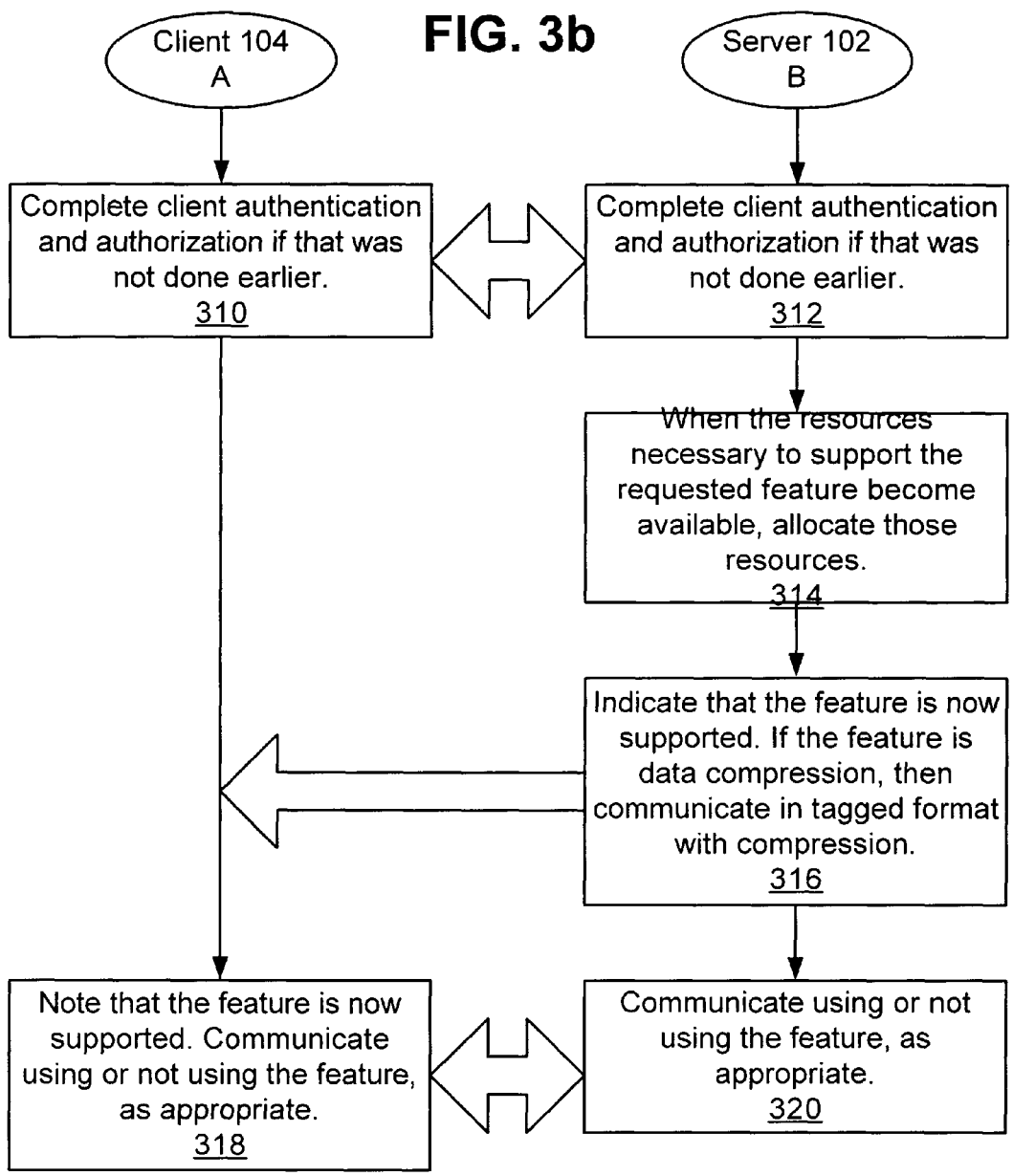

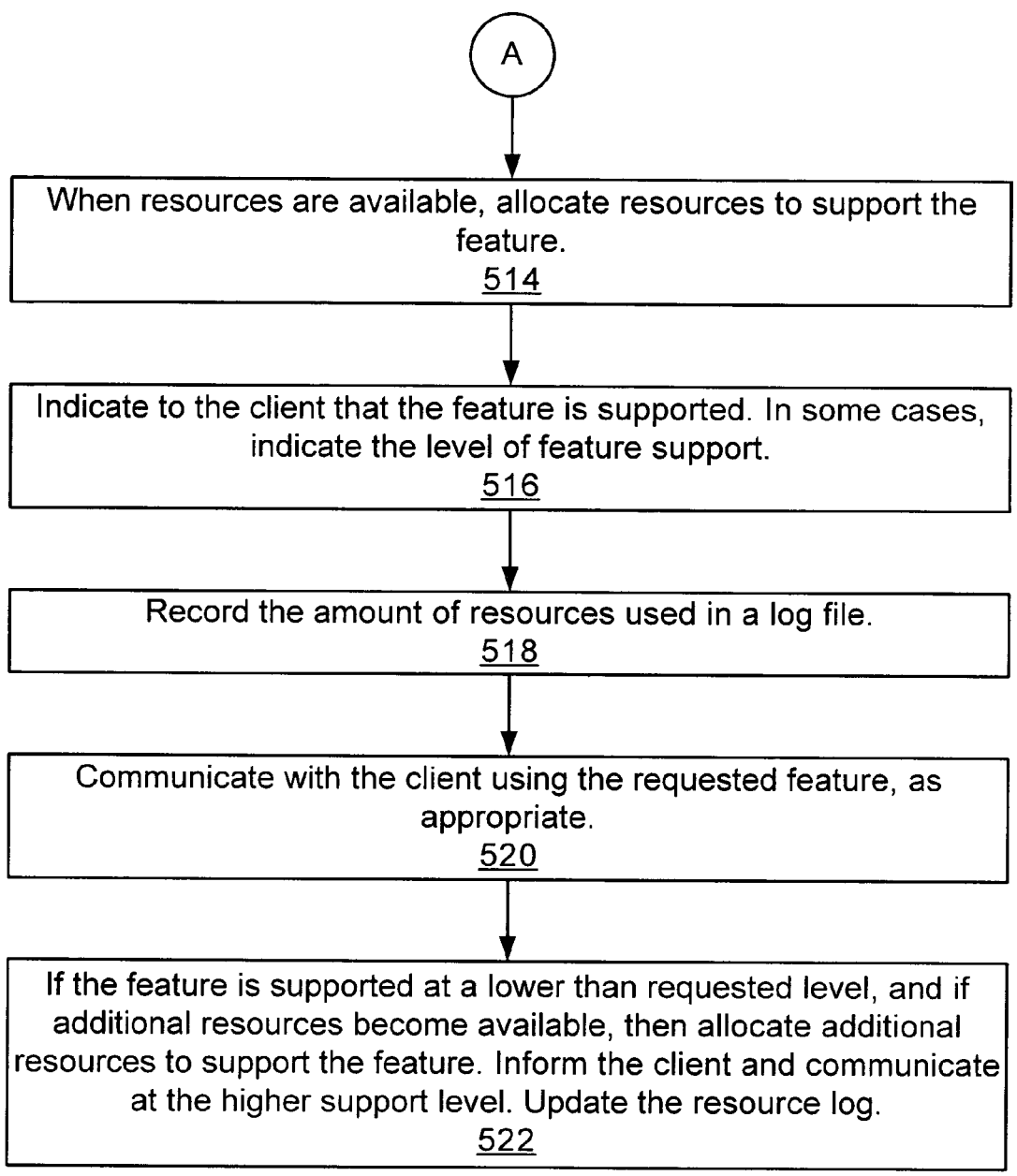

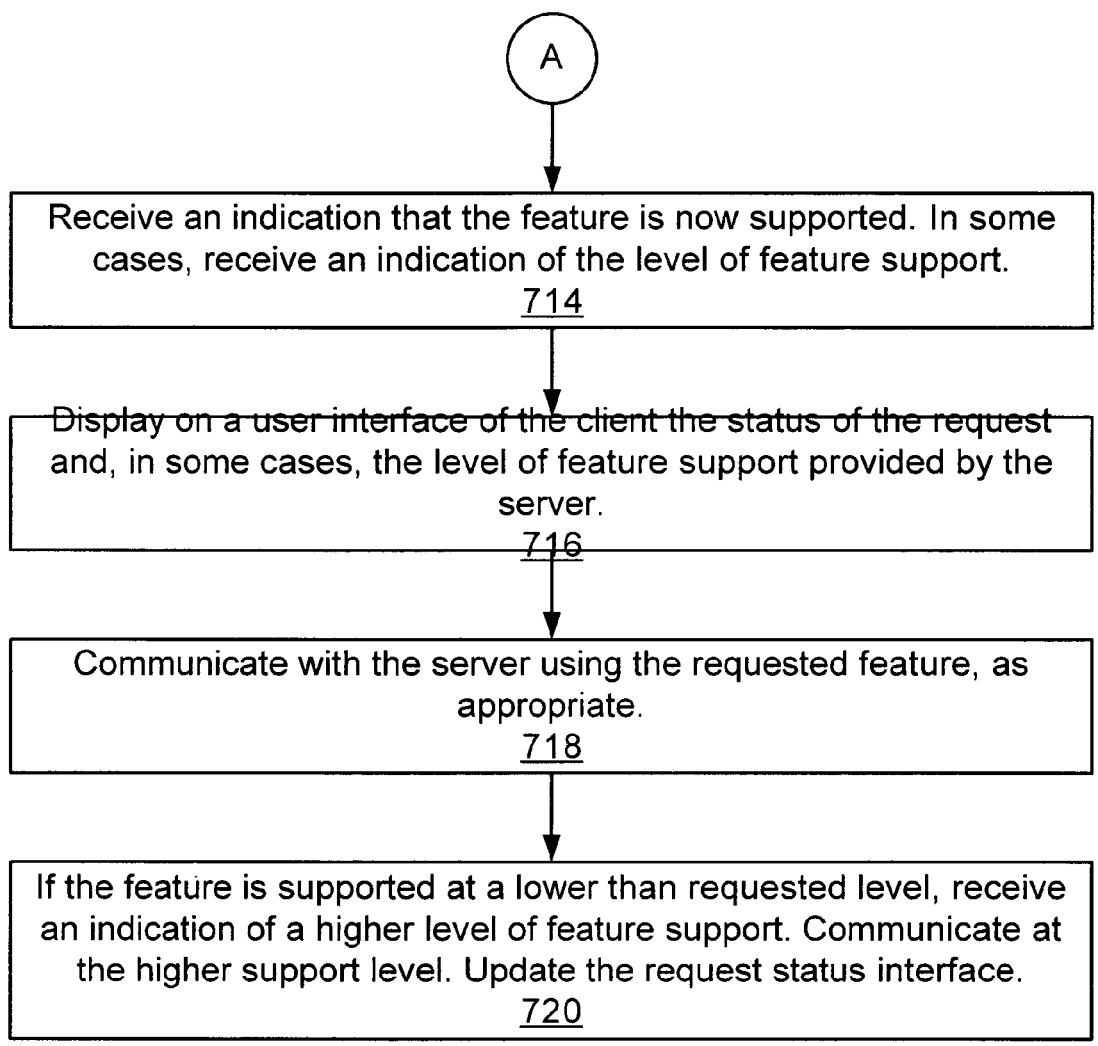

METHOD AND SYSTEM FOR DELAYED ALLOCATION OF RESOURCES

RELATED APPLICATION

The present application claims the benefit of U.S. Provisional Patent Application 60/451,151, filed on Feb. 28, 2003, which is incorporated herein in its entirety by reference.

TECHNICAL FIELD

The invention relates generally to network communications and, more particularly, to allocating resources among clients and servers on a network.

BACKGROUND OF THE INVENTION

The rapid growth of computer networks, both public and private, in recent years has been spurred, in large part, by "client/server computing." In this model, one computing device, the client, requests that another computing device, the server, provide services or features to it. Note that "client" and "server" are used solely to denote the parties in a request transaction. While some computing devices are implemented as dedicated servers that can serve multiple clients, a client and a server can switch roles from one transaction to another. In a "peer-to-peer" network (common, for example, among devices communicating via short range radio), every computing device has the potential to be both a client and a server, serially or simultaneously.

Servers often have to allocate precious resources to fulfill a request for a feature or for a service. Upon receiving a request from a client, a server checks the availability of its resources. Traditionally, if the server does not have the resources to fulfill the request, then the server rejects the request. If the client can proceed without the requested feature or service, then it does so and resubmits the request later, at which time the server may have the necessary resources available to fulfill the request.

In order to ensure that precious server resources are dedicated only to those clients authorized to use them, servers often check the identity of a client making a request. If the client cannot authenticate itself to the satisfaction of the server, then the server rejects the request.

This protection against unauthorized clients is not perfect, however. Some types of requests are made before the authorization process is complete. Processing these requests, even if they are ultimately rejected, consumes some level of server resources. For example, a nefarious client could bring a "denial of service" (DOS) attack against a server by repeatedly making requests of the server. Although this client will fail to authenticate itself and its requests will ultimately be rejected, the server may in the mean time utilize so many resources attempting to authenticate the client during each request that the server exhausts its resource pool until the server is rendered incapable of fulfilling any requests, even those made by authorized clients.

SUMMARY OF THE INVENTION

In view of the foregoing, the present invention allows a server to delay allocating resources to a client's request. When the client requests a service or a feature that requires server resources (such as, for example, encryption or compression of the messages between the client and the server), the server accepts and acknowledges the client's request, but the client is prohibited from using the requested feature until further notice from the server. For example, during an authorization process, the server allocates only the minimum resources required to maintain the session and to authorize the client. Thereafter, the server allocates the resources necessary to support the client's request only when the resources become available. Until then, the server maintains the communications session without supporting the request. Thus, the server shepherds its resources rather than committing them at the whim of a potentially malicious, malfunctioning, or misconfigured client. Also, a legitimate client need not repeat its request if the server cannot immediately satisfy it; instead, the server accepts the request and then later begins to support it when adequate resources become available.

According to one embodiment, after receiving a request for data compression from a client, the server accepts and acknowledges the request but delays allocating the resources necessary to compress communications data. Indeed, the server might not even check to see whether resources are available until the client has successfully authenticated itself to the server. Even though the compression request has been accepted, the client and server communicate without compressing their data. This continues until, and if, the resources necessary for compression become available on the server. At that time, the server allocates the necessary resources and indicates to the client that compression is now supported. The server can signal this by, for example, sending compressed data to the client. Upon receiving the signal (e.g., the compressed data), the client realizes that it is now permitted to communicate with compression. The client responds by beginning to transmit compressed data to the server.

Compression is just one example of a communications feature that can be requested by a client. Other examples include the wide range of features commonly called Quality of Service (QOS). QOS features include, generally, bandwidth, response time guarantees, immunity to error, integrity of message sequence and lack of duplication, maximum permissible loss rates, and the like. QOS features provide examples where, in keeping with one embodiment of the present invention, the server can allocate resources level by level rather than all at once. For example, the client requests a great amount of guaranteed bandwidth. The server initially accepts the request but allocates resources sufficient to support only a low amount of guaranteed bandwidth. The client recognizes this and uses only the low amount of bandwidth. Later, the server allocates more bandwidth to this client (in response, for example, to another client releasing bandwidth), and the client begins to use the greater bandwidth amount.

Also in keeping with the invention, a server or a client (or both) maintains information about the requested feature and about the actual level of service being supported. The server monitors this information for each client and allocates additional resources to the clients as resources become available in order to more fully support the clients' requests.

A client can display to its user the status of requests as accepted and supported, accepted but not yet supported, and rejected. The server can provide similar information to an administrator or to a log file.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 3a and 3b together form a data-flow diagram illustrating an exemplary message exchange between a client and a server during negotiation of the client's communications feature request;

FIGS. 5a and 5b together form a flowchart illustrating an exemplary resource allocation method performed by a server;

FIGS. 7a and 7b together form a flowchart illustrating an exemplary feature request method performed by a client; and

DETAILED DESCRIPTION OF THE INVENTION

Figure 1:
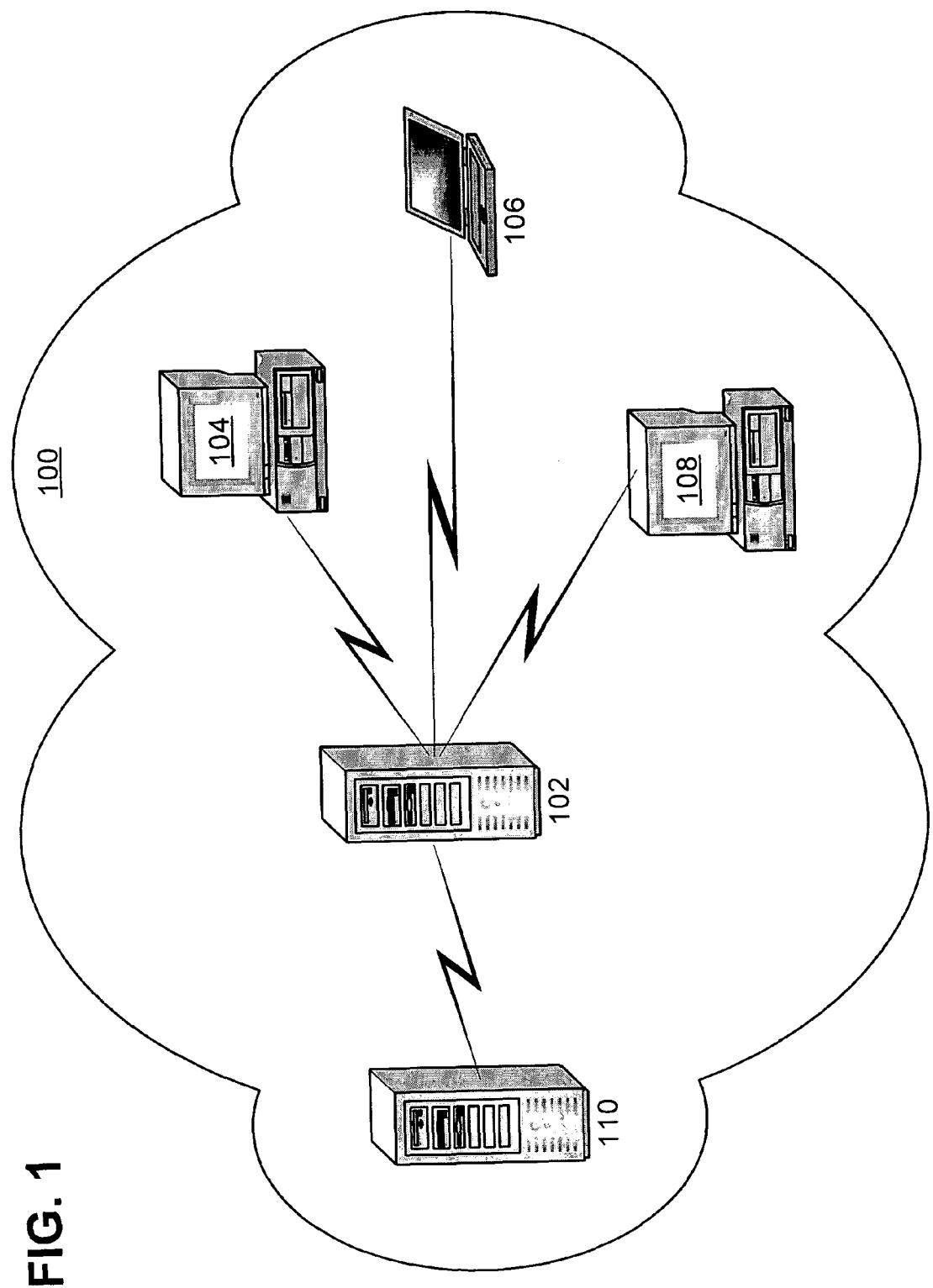
FIG. 1 is a block diagram of an exemplary computer networking environment within which the present invention can be practiced.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures, where data are maintained, are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention allows a server to accept a client request but to delay allocating the resources necessary to support that request. FIG. 1 gives an example of a computer networking environment 100 in which the invention can be used. The example network 100 includes a server computing device 102 and three client computing devices 104, 106, and 108. The network 100 can be a corporate local area network (LAN), a wireless network, the Internet, or anything in between and can include many well known components, such as routers, gateways, hubs, etc. In an example transaction, the client 104 requests a service or a communications feature from the server 102. The server 102 provisionally accepts the request but does not allocate resources to support the requested feature until, for example, the client 104 authenticates itself to the server 102 or until the resources become available. Until the resources are allocated and the server 102 informs the client 104 of that fact, the client 104 and the server 102 communicate without using the requested feature. Thus, the server 102 shepherds its resources rather than committing them at the whim of a potentially malicious, malfunctioning, or misconfigured client.

In another transaction, the client 104 and the server 102 can switch roles with the "server" 102 requesting a service from the "client" 104. In a peer-to-peer network, every computing device can be both a client and a server, serially or simultaneously. Accordingly, embodiments of the invention can be practiced on clients, servers, peers, or any combinations thereof.

The computing device 110 is another server but one that only directly communicates with the server 102 to provide resources to it. Its presence illustrates that by following the methods of the present invention, the server 102 shepherds not just its own resources but the resources of the networking environment 100 generally.

Figure 2:
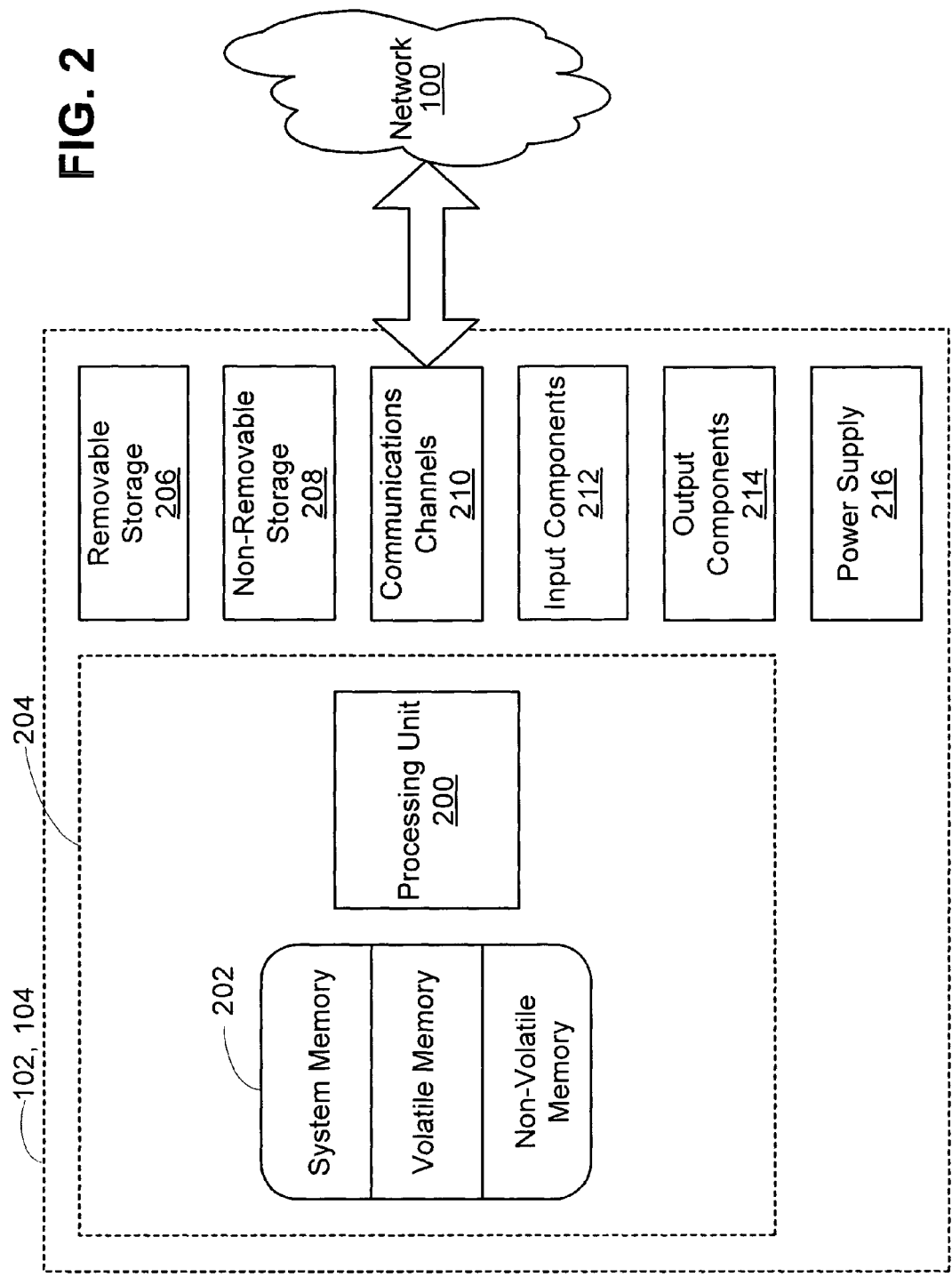
FIG. 2 is a schematic diagram generally illustrating an exemplary computer system that supports the present invention.

The computing devices 102 and 104 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Nor should the computing device 102 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, tablet devices, multiprocessor systems, microprocessor-based systems, set-top boxes, programmable consumer electronics, network PCs, minicomputers, mainframe computers, and distributed computing environments that include any of the above systems or devices. In its most basic configuration, the computing device 102 typically includes at least one processing unit 200 and memory 202. The memory 202 may be volatile (such as RAM), non-volatile (such as ROM or flash memory), or some combination of the two. This most basic configuration is illustrated in FIG. 2 by the dashed line 204. The computing device 102 may have additional features and functionality. For example, the device 102 may contain additional storage (removable and non-removable) including, but not limited to, magnetic and optical disks and tape. Such additional storage is illustrated in FIG. 2 by removable storage 206 and by non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and can be accessed by the computing device 102. The device 102 may also contain communications channels 210 that allow the computer to communicate with other devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, infrared, and other wireless media. The term "computer-readable media" as used herein includes both storage media and communications media. The computing device 102 may also have input devices 212 such as a keyboard, mouse, pen, voice-input device, tablet, touch-input device, etc. Output devices 214 such as a display (which may be integrated with a touch-input device), speakers, and printer may also be included. All these devices are well known in the art and need not be discussed at length here.

FIGS. 3a and 3b together show an exemplary exchange of messages when the client 104 requests a feature from the server 102. FIGS. 5a, 5b, 7a, and 7b, below, present further details of possible message exchanges. The client 104 requests the feature in step 300 of FIG. 3a. The feature can be of any type including data compression, data encryption, and the numerous QOS features. The message protocol can also be of any type, such as, e.g., SIP (the Session Initiation Protocol). Note that the feature request in step 300 need not be explicit: It may instead be implied by the message protocol used between the client 104 and the server 102.

In step 302, the server 102 receives the feature request and decides whether it will support that feature. If not, then the server 102 uses the methods defined in the protocol to reject the request (not shown). If the server 102 will support the requested feature and is ready to do so immediately, then the server 102 allocates the resources needed to support the feature and accepts the request (also not shown). The scenario depicted in FIGS. 3a and 3b concerns a third possibility for the server 102: It may be willing to support the requested feature in the future but is not yet ready to do so. One example that leads to this scenario is the case where the server 102 currently does not have the resources available to support the feature but expects to acquire those resources soon. In another example, the server 102 does not yet trust the client 104 enough to allocate precious resources to its request. The server 102 does not yet allocate the resources but waits until the client 104 has successfully authenticated itself. (See the discussion of steps 310 and 312 of FIG. 3b below.) In the scenario of FIG. 3a, the server 102 in step 302 sends a message to the client 104 indicating that the request has been accepted but also indicating that the requested feature is not yet supported.

There are numerous ways in which the server 102 can indicate that the requested feature is not yet supported. In SIP, for example, when data compression is allowed on a communications link, "tags" are added to the data fields. (See FIG. 4 and the accompanying discussion.) Not all data messages are compressed even when compression is enabled (for example, a given message may be too short to benefit from compression), so a flag in a tag indicates whether the accompanying data are compressed. Embodiments of the present invention can use this tag and flag in step 302: The acceptance message is tagged indicating that the request for data compression has been allowed, but the data in that message are not compressed, as indicated by the flag. In step 304, the client 104 receives the acceptance message and notes that the requested feature is not yet supported. In the data compression example, the tag indicates the acceptance of the request, but the lack of compression indicates that the server is not ready for compressed data.

In steps 306 and 308, the client 104 and the server 102 communicate without using the requested feature. Depending upon circumstances, these steps can continue for a long time (until, e.g., the server 102 acquires the necessary resources) or can be very short (e.g., only until the client 104 successfully authenticates itself to the server 102).

Steps 310 and 312 of FIG. 3b are, in one sense, optional but are included because they illustrate a scenario in which the methods of the present invention are very useful. During these steps, the client 104 authenticates itself to the server 102 using the methods established by the protocol they are using. (Many such methods are known in the art.) The server 102 is understandably reluctant to allocate precious resources until these steps are complete. Although this scenario is not the only one in which delayed allocation of resources proves valuable, it is one scenario closely tied to preventing DOS attacks.

Finally, in step 314 the server 102 decides to allocate the resources to support the client 104's request. In step 316, the server 102 indicates to the client 104 that the feature is now supported. Just as with the numerous possible indications discussed above with respect to step 302, there are numerous ways in which the server 102 can indicate that the feature is now supported. Using the data compression example, the server 102 can simply send compressed data to the client 104. Upon receiving the indication, whatever it is, the client 104 notes that the feature is now supported in step 318. From this point on, the client 104 and the server 102 can communicate either using or not using the requested feature, as appropriate to the situation.

Figure 4:
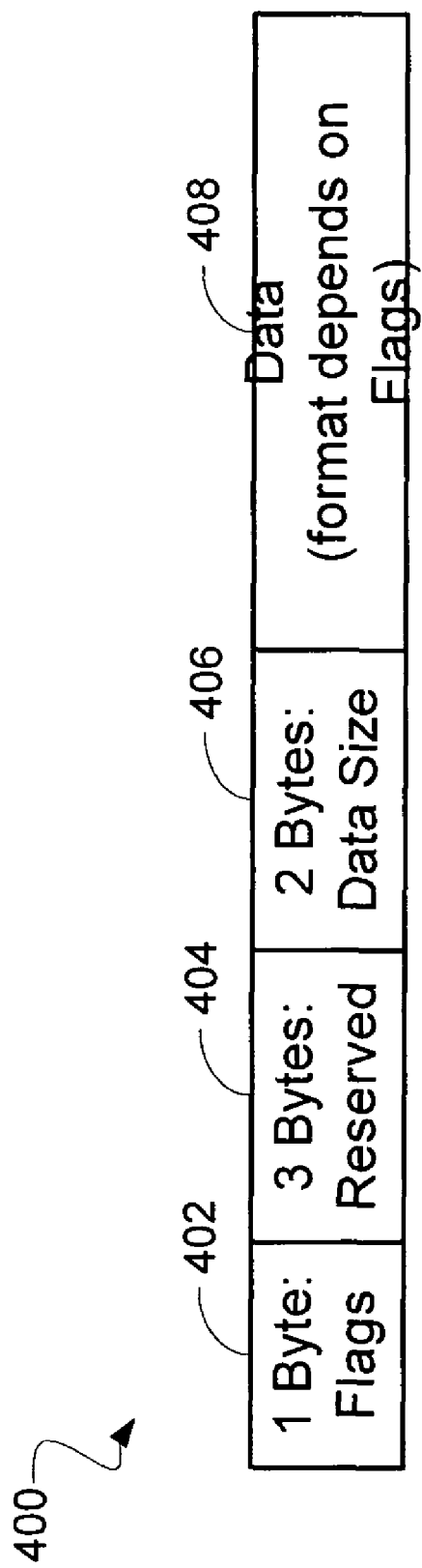
FIG. 4 is a data-structure diagram of an exemplary message exchanged between the client and the server during the scenario of FIGS. 3a and 3b.

FIG. 4 shows a message data structure 400 used for sending compressed or uncompressed data. The data structure 400 includes three tag fields. The first tag field 402 is designated for flags (herein "flags tag"). The flags tag field 402 is used for indicating the format of the data in field 408, specifically whether the data are compressed. Under this implementation, the flag field includes mutually exclusive bits. As an example, a 0x80 bit is used to indicate that the data are uncompressed, and a 0x20 bit indicates that the data are compressed.

In some embodiments, there are at least three types of data packets: (1) untagged data indicating that data compression is not available for the current connection; (2) data tagged indicating that compression is possible, but the data in field 408 are flagged as not compressed; and (3) data tagged indicating that compression is possible, and the data in field 408 are compressed. In steps 304 and 318 of FIGS. 3a and 3b, respectively, the client 104 determines the type of data packet it receives from the server 102 to know whether or not data compression is supported.

Figure 5A:
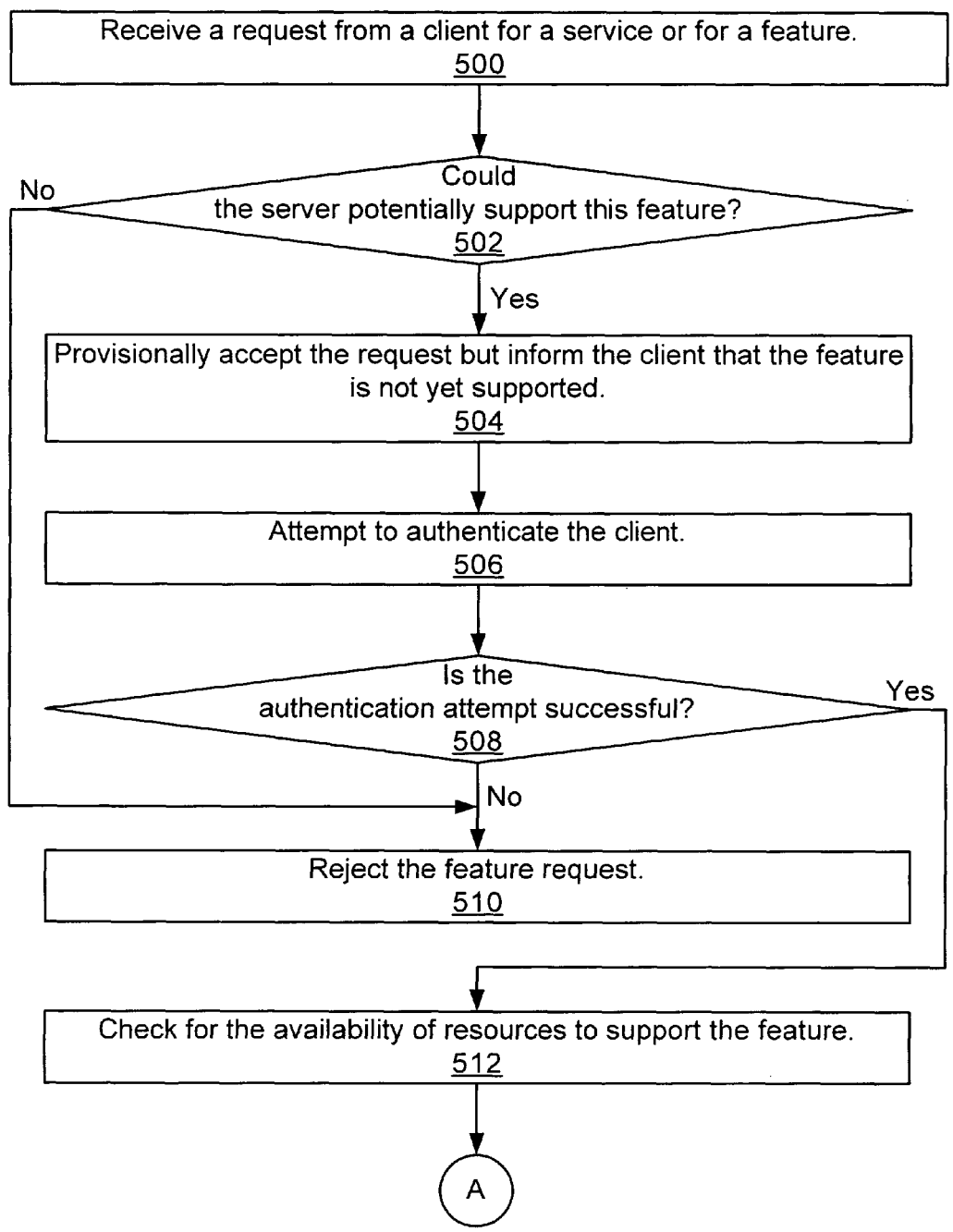

A flowchart illustrating exemplary steps performed by the server 102 is shown in FIGS. 5a and 5b. In step 500, the server 102 receives a request from the client 104 for a service or for a communications feature. As mentioned above, this request may be in the form of an explicit message sent by the client 104, or it may be implicit in the communications protocol used between the client 104 and the server 102. The server 102 checks, in step 502, its own configuration to see whether it can support the requested feature. It could happen that the client 104 is requesting a feature that the server 102 is not configured to support. In that case, the method proceeds to step 510 where the server 102 rejects the request.

If the server 102 could, at least theoretically, support the requested feature, then in step 504 it accepts the request but tells the client 104 that the client 104 may not yet use the feature.

There are some features that the server 102 will only provide to authenticated clients. If the client 104 has requested such a feature, then in step 506 an authentication process is carried out. If the client 104 fails the authentication in step

508, then the server 102 can reject the request in step 510, even though it provisionally accepted the request earlier in step 504. Note that an authentication failure does not necessarily imply that the client 104 must terminate its communications session with the server 102. While that is a possible outcome, for the present discussion, the consequence of an authentication failure is the client 104's inability to use the requested feature.

If the client 104 successfully authenticates itself to the server 102 (or if such authentication is not necessary), then the client 104 and the server 102 begin to communicate with each other but without using the requested feature. If necessary, the server 102 checks for the availability of sufficient resources in step 512 and when, in step 514 of FIG. 5b, such resources become available, the server 102 allocates them to support the feature requested by the client 104. As mentioned above in relation to FIG. 1, these resources need not reside on the server 102 itself. They may be provided by another server 110. In some scenarios, the resources may become available in step 514 when another client gives them up. In other scenarios, the resources are always available, but the server 102 is reluctant to commit them to the client 104 until the client 104 successfully authenticates itself in step 508 of FIG. 5a.

In step 516 of FIG. 5b, the server 102 indicates that it is now ready to support the requested feature. Some features can be supported at different levels. For example, the client 104 requests a minimum bandwidth guarantee of 512 kbps. If the server 102 does not have the resources to fully support that request, it could simply reject it. Alternatively, the server 102 can accept the request but tell the client 104 that the server 102 can only support a 128 kbps bandwidth guarantee. The client 104 decides whether the lower guarantee is acceptable or not and reacts accordingly.

Throughout this procedure, the server 102 tracks its resource levels and allocations, as indicated in step 518. The server 102 uses this information when deciding whether it has sufficient resources to support a requested feature. System administrators use this information when deciding whether the server 102 is optimally configured.

Figure 6:
FIG. 6 is a data-structure diagram of a request status list usable by a server.

FIG. 6 gives an example of the server 102's resource log. The resource allocation log 600 contains four entry rows, each one pertaining to a single feature request. In the log 600, the client 104 (field 602) has requested data compression (field 604), and that request has been accepted (field 606). The client 106's request for data compression was rejected, possibly because the client 106 failed to authenticate itself to the server 102. The client 108's request for data compression has been provisionally accepted, but that feature is not yet supported. The client 108 has made another request, this time for a guaranteed bandwidth of 512 kbps. The request has been accepted, but the feature is currently supported only at the lower level of 128 kbps.

In step 520 of FIG. 5b, the client 104 and the server 102 can use the requested feature in their communications. However, they are not required to use the feature. For example, even when compression is supported, some messages are too short to benefit from being compressed.

Another use of the server 102's resource allocation log 600 is illustrated in step 522. Here, some resources are freed up (probably from another client), and the server 102 checks its resource allocation log 600. It notes, for example, that the client 108 requested 512 kbps of guaranteed bandwidth but was only granted 128 kbps. If the server 102 can and wishes to support the client 108's request at a higher level, it can now do so. For some features, the server 102 can even use this method to reduce its level of support. Other features do not allow for this, and the level of support must be renegotiated.

Figure 7A:
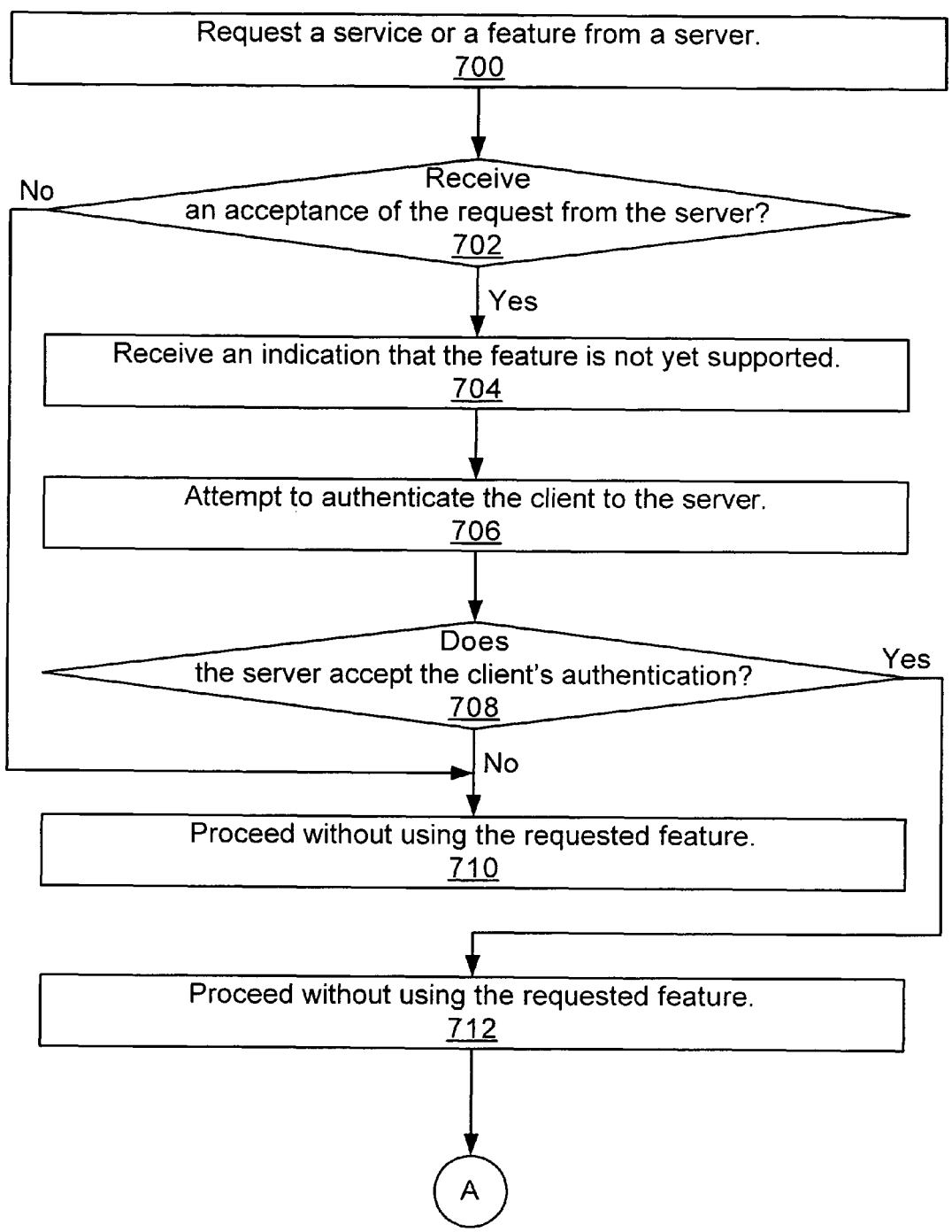

The client 104's side of a feature request transaction is illustrated in the flowchart of FIGS. 7a and 7b. As the bulk of the client 104's procedure is evident in light of the above discussion of the server 102's procedure, only a few aspects need be discussed here. The client 104 can maintain a log of its own requests similar to the server 102's resource allocation log 600 of FIG. 6. The status of feature requests, including their level of support if appropriate, can be displayed to a user of the client 104 as indicated in steps 716 and 720 of FIG. 7b.

The above discussion focuses on the expected course of an exchange between the server 102 and the client 104. The following table illustrates some of the unexpected things that can occur and how the client 104 should react.

Potential Responses That the Client Should Be Prepared to Handle When Requesting a Feature

| Response | Meaning | Appropriate Handling |
| --- | --- | --- |
| Transaction timeout. Invalid response. Response with no indication of the requested feature. Response with an invalid indication of the requested feature. | Negotiation has failed. | Fall back to not using the requested feature on this link. |
| 400 | The server does not support the NEGOTIATE method at this point in time or fails to recognize the method as valid. | Fall back to not using the requested feature on this link. |
| 405, 501 | The server does not support the NEGOTIATE method. | Fall back to not using the requested feature on this link. |
| 488, 606 | The server does not support the requested feature. | Fall back to not using the requested feature on this link. |

| Potential Responses That the Client Should Be Prepared to Handle When Requesting a Feature | | |
|---|---|---|
| Response | Meaning | Appropriate Handling |
| 403 | The server is denying the request. | Close the connection. Open a new connection and do not request the feature. Do not use the requested feature on this link. |
| 408, 480, 504 | Timeout. | Retry after a suitable delay. Multiple timeouts should result in closing the connection and raising an appropriate alarm. This indicates loss of connectivity to the server. |
| 1xx | Provisional response. | Ignore. |
| 2xx | Success. | Enable the requested feature for this link. |
| 3xx | The server is redirecting the request. | Ignore. Fall back to not using the requested feature on this link. |
| 4xx, 5xx, 6xx | Other errors. | Ignore. Fall back to not using the requested feature on this link. |

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

We claim:

1. In a communications environment comprising a server and a client, the server and the client each being a computing device, a method for the server to delay supporting a feature for the client, the feature requiring resources of the server, the method comprising:
receiving from the client a request for the feature; and
determining by the server whether the server supports the requested feature,
when it is determined that the server does not support the requested feature, sending an indication to the client that the request is rejected; and
when it is determined that the server does support the requested feature, sending to the client an indication that the request has been granted;
sending to the client an indication that the requested feature is not yet supported; and
after sending to the client the indication that the requested feature is not yet supported,
determining by the server whether the client is authenticated;
when it is determined that the client is not authenticated, sending to the client an indication that the client is not authenticated; and
when it is determined that the client is authenticated, sending to the client an indication that the client is authenticated;
sending to the client an indication that the requested feature is supported; and
supporting by the server the requested feature for the client by allocating resources required by the requested feature for the client.

2. The method of claim 1 wherein the requested feature is a feature of communications between the client and the server selected from the group consisting of: compression, a quality of service, bandwidth, a response time guarantee, immunity to error, integrity of message sequence and lack of duplication, and a maximum permissible loss rate.

3. The method of claim 1 wherein receiving a request for the feature comprises receiving from the client an explicit request for the feature.

4. The method of claim 1 wherein receiving a request for the feature comprises receiving from the client an implicit request for the feature.

5. The method of claim 1 wherein receiving a request for the feature comprises receiving a request for a first level of support of the requested feature, and wherein sending to the client an indication that the requested feature is supported comprises sending to the client an indication that the requested feature is supported at a second level of support of the requested feature.

6. The method of claim 1 wherein when the indication that the requested feature is not yet supported is sent to the client, not using the requested feature in communications with the client.

7. The method of claim 1 wherein when the indication that the requested feature is supported is sent to the client, using the requested feature in communications with the client.

8. The method of claim 1 wherein supporting the requested feature for the client comprises allocating resources.

9. The method of claim 1 further comprising:
logging statuses of feature requests as rejected, accepted but not yet supported, or accepted and supported.

10. The method of claim 4 wherein the implicit request for the feature is specified by a communications protocol used by the client and by the server.

11. The method of claim 4 wherein the second level of support of the requested feature is less than the first level of support of the requested feature.

12. The method of claim 5 wherein supporting the requested feature for the client comprises supporting the requested feature at the second level of support of the requested feature.

13. The method of claim 5 further comprising:
after sending to the client the indication that the requested feature is supported at the second level of support of the requested feature, sending to the client an indication that the requested feature is supported at the first level of support of the requested feature.

14. The method of claim 8 wherein allocating resources comprises allocating resources provided by a computing device other than the server.

15. The method of claim 8 further comprising:
checking for an availability of resources for supporting the requested feature; and
delaying the sending to the client the indication that the requested feature is supported until resources for supporting the requested feature are available.

16. The method of claim 9 further comprising:
logging levels of support of feature requests; and
logging resources allocated to support of feature requests.

17. The method of claim 15 further comprising:
maintaining information about resources used and about not-yet-supported feature requests.

18. The method of claim 17 wherein the server supports a plurality of clients and wherein resources become available for supporting the requested feature as they are relinquished by other clients.

19. A computer-readable storage device containing computer-executable instructions for performing a method for a server computing device to delay supporting a feature for a client computing device, the method comprising:
receiving a request for the feature;
indicating to the client that the request has been granted;
indicating to the client that the requested feature is not yet supported without allocating resources to support the requested feature;
after indicating to the client that the requested feature is not yet supported,
performing authentication of the client, the authentication being successful or unsuccessful;
after unsuccessful authentication of the client, indicating to the client that the authentication was unsuccessful;
after successful authentication of the client,
indicating to the client that the requested feature is supported; and
supporting the requested feature for the client including allocating resources to support the requested feature;
upon receiving from the client prior to indicating that requested feature is supported a request to access the requested feature, rejecting the request; and
upon receiving from the client after indicating that the requested feature is supported a request to access the requested feature, granting the request
wherein allocating resources to support a requested feature is delayed until the client is authenticated.

20. In a communications environment comprising a server computing device and a client computing device, a method for the client to obtain support from the server for a feature, the method comprising:
requesting the feature from the server;
receiving an indication that the request has been granted;
receiving an indication that the requested feature is not yet supported;
refraining from using the requested feature; and
after receiving the indication that the requested feature is not yet supported,
sending to the server authentication information of the client;
after the server does not successfully authenticate the client, receiving an indication that the authentication was not successful; and
after the server successfully authenticates the client and allocates resources for the requested feature,
receiving from the server an indication that the requested feature is supported; and
using the requested feature.

21. The method of claim 20 wherein the requested feature is a feature of communications between the client and the server selected from the group consisting of: compression, a quality of service, bandwidth, a response time guarantee, immunity to error, integrity of message sequence and lack of duplication, and a maximum permissible loss rate.

22. The method of claim 20 wherein requesting the feature comprises sending an explicit request for the feature to the server.

23. The method of claim 20 wherein requesting the feature comprises implicitly requesting the feature.

24. The method of claim 20 wherein requesting the feature comprises requesting a first level of support of the requested feature, and wherein receiving an indication that the requested feature is supported comprises receiving an indication that the requested feature is supported at a second level of support of the requested feature.

25. The method of claim 20 wherein receiving one indication comprises receiving an indication that the request has been granted and receiving an indication that the requested feature is not yet supported.

26. The method of claim 20 wherein receiving an indication that the requested feature is not yet supported comprises receiving communications from the server that do not use the requested feature.

27. The method of claim 20 wherein receiving an indication that the requested feature is supported comprises receiving communications from the server that use the requested feature.

28. The method of claim 20 further comprising:
displaying to a user of the client a status of the feature request as rejected, accepted but not yet supported, or accepted and supported.

29. The method of claim 23 wherein the implicit request for the feature is specified by a communications protocol used by the client and by the server.

30. The method of claim 24 wherein the second level of support of the requested feature is less than the first level of support of the requested feature.

31. The method of claim 24 wherein using the requested feature comprises using the requested feature at the second level of support of the requested feature.

32. The method of claim 24 further comprising:
after receiving an indication that the requested feature is supported at the second level of support of the requested feature, receiving an indication that the requested feature is supported at the first level of support of the requested feature.

33. The method of claim 28 further comprising:
displaying to a user of the client a level of support of the feature request.

34. A computer-readable storage device containing computer-executable instructions for performing a method for a client computing device to obtain support from a server computing device for a feature, the method comprising:
  requesting the feature from the server;
  receiving an indication that the request has been granted;
  receiving an indication that the requested feature is not yet supported;
  refraining from using the requested feature;
  after receiving the indication that the requested feature is not yet supported,
    sending to the server authentication information of the client;
    after the server does not successfully authenticate the client, receiving an indication that the authentication was not successful; and
    after the server successfully authenticates the client and allocates resources for the requested feature,
      receiving an indication that the requested feature is supported; and
      using the requested feature.

35. In a communications environment comprising a server computing device and a client computing device, a method for the server to delay supporting a feature for the client and for the client to obtain support from the server for the feature, the method comprising:
  requesting, by the client, the feature from the server;
  receiving, by the server, the request for the feature;
  indicating, by the server and to the client, that the request has been granted;
  receiving, by the client, the indication that the request has been granted;
  indicating, by the server and to the client, that the requested feature is not yet supported;
  receiving, by the client, the indication that the requested feature is not yet supported;
  refraining, by the client, from using the requested feature; and
  after indicating, by the server and to the client, that the requested feature is not yet supported,
    performing authentication of the client, the authentication being successful or unsuccessful;
    after unsuccessful authentication of the client, indicating, by the server and to the client, that the authentication was unsuccessful; and
    after successful authentication of the client,
      supporting, by the server, the requested feature for the client, the supporting including allocating resources to support the requested feature;
      indicating, by the server and to the client, that the requested feature is supported; and
      after receiving, by the client, the indication that the requested feature is not yet supported,
        receiving, by the client, the indication that the requested feature is supported; and
        using, by the client, the requested feature.

36. A computer-readable storage device containing computer-executable instructions for performing a method for a server computing device to delay supporting a feature for a client computing device and for the client to obtain support from the server for the feature, the method comprising:
  requesting, by the client, the feature from the server;
  receiving, by the server, the request for the feature;
  indicating, by the server and to the client, that the request has been granted;
  receiving, by the client, the indication that the request has been granted;
  indicating, by the server and to the client, that the requested feature is not yet supported;
  receiving, by the client, the indication that the requested feature is not yet supported;
  refraining, by the client, from using the requested feature; and
  after indicating, by the server and to the client, that the requested feature is not yet supported,
    performing authentication of the client, the authentication being successful or unsuccessful;
    after unsuccessful authentication of the client, indicating, by the server and to the client, that the authentication was unsuccessful; and
    after successful authentication of the client,
      supporting, by the server, the requested feature far the client, the supporting including allocating resources to subpart the requested feature;
      indicating, by the server and to the client, that the requested feature is supported;
      after receiving, by the client, the indication that the requested feature is not yet supported,
        receiving, by the client, the indication that the requested feature is supported; and
        using, by the client, the requested feature.

\* \* \* \* \*

UNITED STATES PATENT AND TRADEMARK OFFICE
CERTIFICATE OF CORRECTION

| | | |
|---|---|---|
| PATENT NO. | : 8,086,741 B2 | Page 1 of 1 |
| APPLICATION NO. | : 10/641525 | |
| DATED | : December 27, 2011 | |
| INVENTOR(S) | : Markaryan et al. | |

It is certified that error appears in the above-identified patent and that said Letters Patent is hereby corrected as shown below:

In column 10, line 65, in Claim 11, delete "4" and insert -- 5 --, therefor.

Signed and Sealed this
Twenty-seventh Day of March, 2012

David J. Kappos
*Director of the United States Patent and Trademark Office*